Patented Aug. 3, 1926.

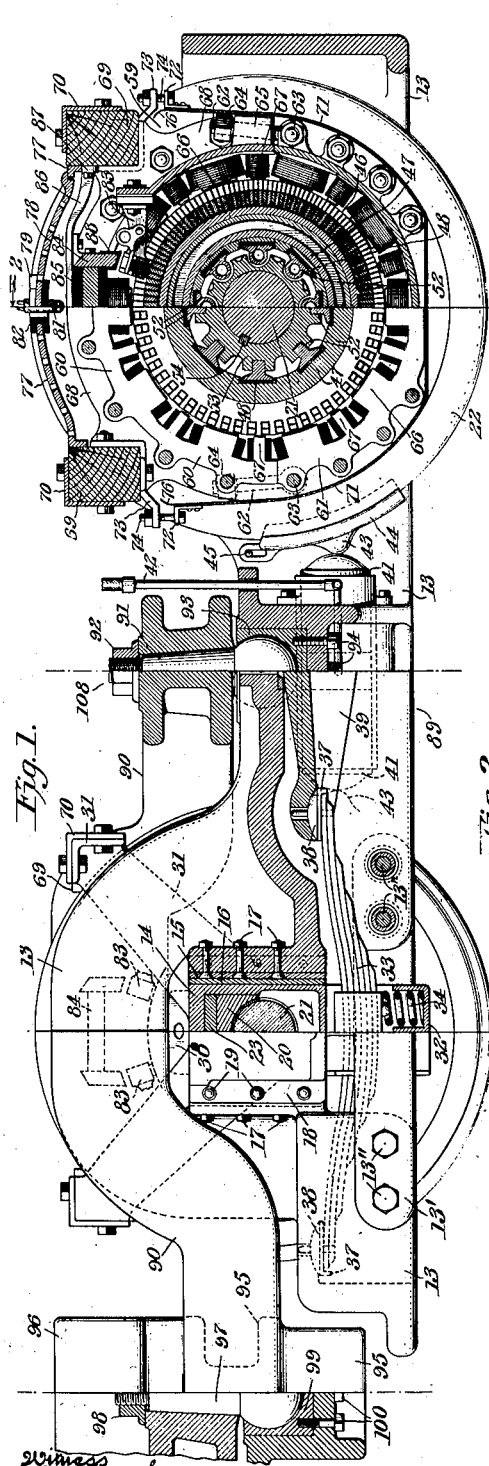

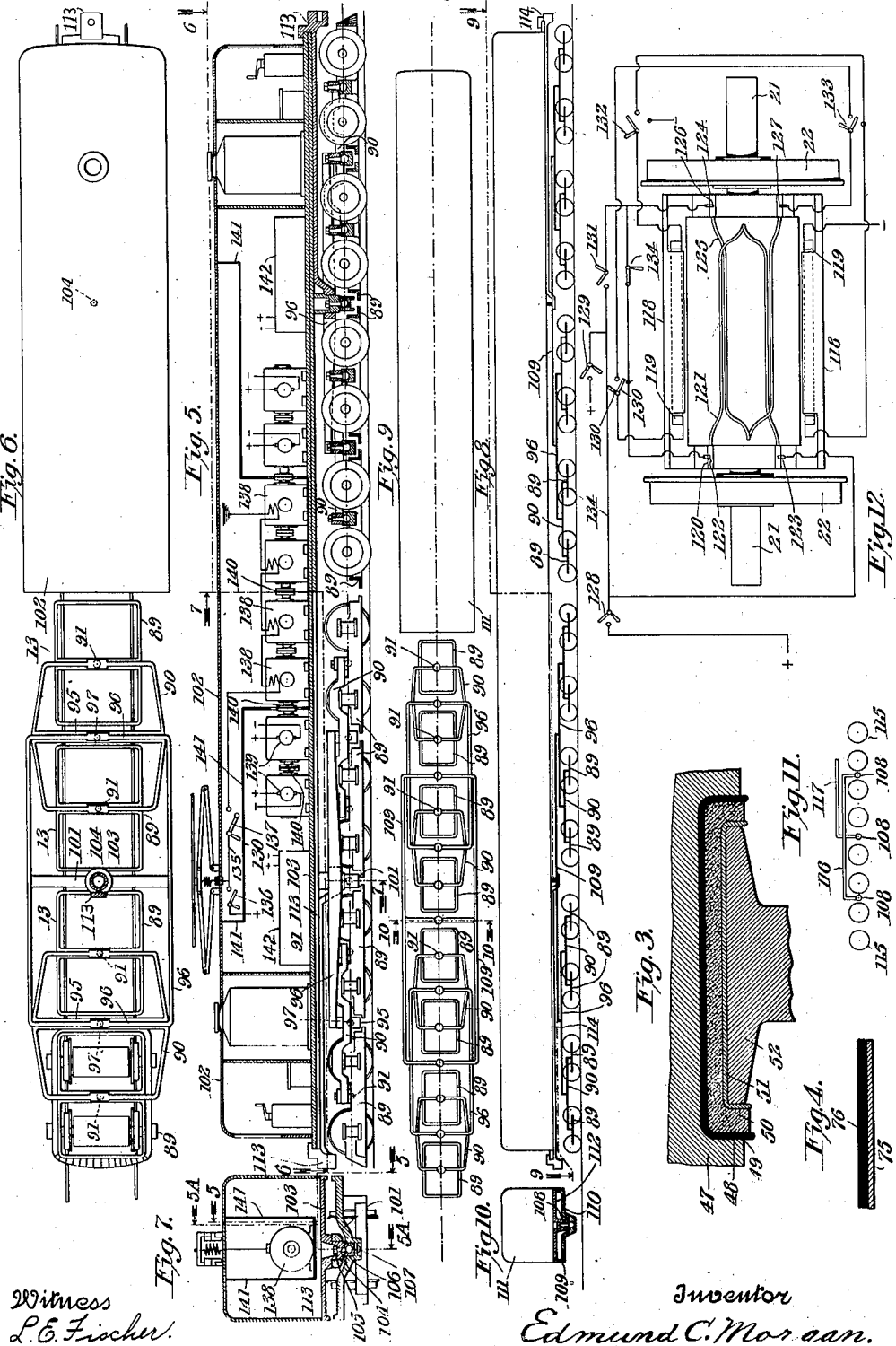

1,594,373

UNITED STATES PATENT OFFICE.

EDMUND C. MORGAN, OF NEW YORK, N. Y.; OLIVE EUGENIE MORGAN EXECUTRIX OF THE WILL OF EDMUND C. MORGAN, DECEASED.

ELECTRIC LOCOMOTIVE.

Application filed September 21, 1921. Serial No. 502,143.

My invention relates to improvements in electric locomotives; and the objects of my improvement are, first, to provide an electric locomotive in which the driving motors are mounted directly on the axles of the driving wheels, each motor, complete with its armature and field frame, being held concentric with the axle without detrimental unsprung weight on the track rails and without deleterious jarring effect to the motor parts; second, to provide quick and accurate adjustment of the field frames to the armatures to compensate for the wear of the axle bearings on which the field frames are mounted and thus make practical the construction of the motors with small air gaps between the armatures and pole faces of their field frames; third, to provide an electric locomotive having a plurality of independent trucks with connecting frames having universal joint connections with the trucks on center lines horizontally through the centers of the axles and laterally between the ends of the axles, and also universal joint connections between the connecting frames on a center line horizontally through the axles and laterally of the frames; fourth, to provide in an electric locomotive a plurality of connecting frames to connect the trucks together all located in approximately the horizontal plane of the driving wheels; fifth, to provide brake mechanism for each drive wheel of the locomotive without the use of mechanical connections between them; sixth, to provide an electric locomotive that will operate at high efficiency from direct current supply and that will also operate at high efficiency from alternating current supply without changing the construction of the driving motors mounted on the driving axles; seventh, to provide an electric locomotive in which each individual driving motor with only switch changed connections will operate with equal speed and power on direct currents of two different tensions, one of one half the voltage of the other; eighth, to provide an electric locomotive in which each one of the driving motors is insulated from the other parts of the locomotive and also bodily insulated from objects that may accidentally come in contact with it; and, ninth, to provide, in addition to the commutating poles of the motor construction, a means to prevent sparking of the brushes on the commutator.

Other objects will appear in the specification and claims.

I attain these objects by the mechanism illustrated in the accompanying drawings, in which—

Figure 1 is a side elevation, partly in section, of a truck unit, a portion of the frame to connect two truck units together and a portion of the frame to connect two sets of connected truck units together; Fig. 2, an end elevation, partly in full and partly in section, taken on line 2 2, Fig. 1, looking in the direction indicated by the arrows. The sections shown in Fig. 1 are taken on Fig. 2, as follows: That portion to the right of a vertical line through the center of the right hand axle, on line 1, 1; that portion between a vertical line through the center of the right hand axle and a vertical line through the center of the truck on line 1$^A$ 1$^A$; that portion between a vertical line through the center of the left hand axle and a vertical line through the center of the truck at line 1$^B$ 1$^B$; the section of the drawing to the immediate left of a vertical line through the center of the left hand axle is in full, while the section to the extreme left is on 1$^A$ 1$^A$. The views are all in the directions indicated by the arrows. Fig. 3, is an enlarged view of a portion of the armature mounting means shown in section in Fig. 1; Fig. 4, is an enlarged view of a portion of the motor protecting shield shown in section in Fig. 1, and in full such portion of it as is below the center line of the axle in Fig. 2; Figs. 5, 6 and 7 are side elevation, top plan view and end elevation respectively of a complete locomotive containing eight of the trucks shown in Figs. 1 and 2, the connecting frames and the locomotive car body containing accessories shown in Fig. 5, partly in section, that part to the left of a vertical line through the center of the locomotive being taken on line 5 5, Fig. 7, and that part to the right of a vertical line through the center of the locomotive on line 5$^A$ 5$^A$, Fig. 7; Fig. 6 is shown partly in section taken on line 6 6, Fig. 5, and Fig. 7, is shown in section taken on line 7 7, Fig. 5; Figs. 8, 9 and 10 respectively are side elevation, top plan view and end elevation of a complete locomotive containing sixteen of the trucks shown in Figs. 1 and 2, the connecting frames and locomotive car body. Fig. 9, is a sectional view taken on line 9 9, Fig. 8, showing the arrangement of the trucks and connecting frames and Fig. 10 is a sectional view taken at 10, 10, Fig. 9; Fig. 11 is a diagrammatic drawing to show the application of my invention as far as the connecting frames are concerned to trucks having eight wheels instead of trucks having four wheels as shown in the preceding views; Fig. 12 is a diagrammatic view to show the construction of a motor with connections and switches to enable it to operate on current of different voltage by its inherent construction. It is to be used in connection with my invention in certain cases in place of the motor shown in the preceding views.

Similar reference signs refer to similar parts throughout the several views.

Referring to Figs. 1 and 2, the truck frame 13, which is preferably made of cast steel, is in the form shown when the truck is the end truck of a locomotive composed of a plurality of trucks. In case the locomotive only had one truck, the shape of the frame would be like that shown at the right of Fig. 1, for both ends, and in case the truck was one of the trucks located between the end trucks of a locomotive having more than two trucks, the frame at both ends would be like that shown at the left in Fig. 1. The frame has gaps to receive the axle boxes 14, the frame and axle boxes being provided with the wearing pieces 15 and 16 respectively, the wearing pieces 15 being secured to the frame 13 by bolts 17 and the wearing pieces 16 being secured to the flanges 18 of the axle boxes by rivets 19.

A pair of braces 13', span the gaps in the frame at each side of the axle boxes and are secured to the frame by bolts 13''. These plates strengthen the frame and also provide guards for the spring supporting pockets to be described.

The axle boxes 14 are provided with bearing segments 20, which receive the journals of the axles 21, on which the driving wheels 22 are secured. The bearing segments are vertically adjustable in the axle boxes by means of wedges 23, having adjusting stud bolts 24 which extend through the ribbed portions 25 of the axle boxes and are secured therein by the nuts 26. Detachably attached to or cast integral with the axle boxes are the cross pieces 27 having a round stud portion on which are mounted a series of wearing discs 28, composed half of steel and half of brass to receive the end thrusts of the axles. These cross pieces are also each provided with a threaded hole to receive a bolt 28', having a hardened center-point to fit a centering depression made in the end of the axle so that when one of these centering bolts is applied at each end of an axle and screwed up tightly the axle boxes will always be brought to a fixed position with relation to the axle; the wear that may have taken place can then be taken up by means of the wedges 23, and the centering bolts then backed off so as to be free of the axle or entirely removed until desired to be used again.

The axle boxes are provided with the usual hinged lids 29, and wooden dust guards 30. They are also provided with the arms 31 which will be referred to further along.

Cast integrally with and extending downwardly from the axle boxes 14 are the spring supporting saddles 32, each one carrying a leaf spring 33 which rests on four spiral springs 34, contained in pockets formed in the saddle, the object being to provide resilient support for the leaf springs.

The frame 13 is supported on the four leaf springs 33, one at each axle box. It rests directly on the springs at their outer ends, the wearing plates 37 and 38, secured to the spring and frame respectively being interposed to prevent the wear of the spring and frame. Equalizing bars 39, one at each side of the truck, are employed to equalize the weight on the driving wheels and are placed between the truck frame and the inner ends of the springs 33, the wearing plates 37 and 38 being used here also to prevent wear.

The brake mechanism for the wheels is carried in the frame 13. This consists of two cylinders 40, 40, one at each side in line with a pair of driving wheels. Each cylinder contains two pistons 41, 41, which when driven out by a pressure medium such as compressed air introduced into the cylinder by means of the pipe 42, causes them to bear on the points 43 of the brake shoes 44, which are hung in the frame 13 by means of rods 45. It will be noted that the pressure will be equalized on the brake shoes because the pressure passages intercommunicate and at the same time each brake shoe is independent mechanically of the other brake shoes. It will also be noted that the contacts between the brake shoes and pistons are on vertical lines so that the setting of the brakes will not prevent vertical movement of the frame 13 with respect to the driving wheels.

The electric motors, one for each axle, shown in Figs. 1 and 2, are exactly alike, so I will confine the description to one which will serve for all. The armature 46 composed of the usual sheet iron rings, coils, commutator, etc., is mounted on a cast steel sleeve 47, which has a tapered bore along which is cut a series of slots 48, each adapted to receive a trough shaped strip made up of insulating material 49, fibrous material 50, which may also be insulating material, and metal 51, fitted together as clearly shown in the enlarged view of this part in Fig. 3. A wedge 52, slidably mounted in a slot in the hub 53, is provided for each of the trough shaped pieces, they being spaced around the hub 53 so as to register with the slots 48. The hub 53 is secured to the axle 21 by a key 54 and at one end is turned to receive a ring 55 of insulating material and a metal ring 56 through which bolts 57 extend and screw into the ends of the wedges 52 to cause them to wedge tightly between the sleeve 47 and the hub 53. Strong spring washers 58 are placed between the heads of the bolts 57 and the plate 56 to serve to compensate for any shrinkage that may take place in the fiber pieces 50. By this construction it will be noted that the armature is non-metallically supported on the axle and also electrically insulated therefrom while at the same time it is strongly mounted to drive the axle. The field frame 59 of the motor is composed of the upper part 60 and the lower part 61, which are secured together by the eye bolts 62, which are pivotally connected to the lower frame 61 by the through bolts 63 and connected to the upper frame 60 by the nuts 64, and the projections 65 which are slotted at their sides to permit the eye bolts to swing out of engagement with them when the nuts are loosened and enable the lower frame to be quickly dropped away from the armature and returned to place again. The field frame is provided with poles 66 and commutating poles 67, together with suitable coils for same, and is entirely supported on the axle boxes 14 of the truck through the flanged projections 68 that are bolted to the wooden beams 69, which are in turn bolted to the angle bars 70 that are bolted to the ends of the arms 31 of the axle boxes. The bolts securing the wooden beams to the flanged projections 68 and the angle bars 70 are arranged so they do not touch, and the wooden beams in consequence serve to insulate the field frame from the angle bars. It should be noted that the wooden beams also form a non-metallic support for the field frame and by this construction and the construction of the armature mounting the entire motor is protected from crystallizing effect of the jar of the driving wheels and is also completely electrically insulated from the other parts of the locomotive. In order that the motor may be still further protected so as to safely carry a very high tension current, it is bodily insulated against accidental contact in the space below the beams 69, for its full width by means of the shield 71, secured to the beams by means of brackets 72 on the shield and brackets 73 on the beams together with bolts 74. This shield 71 is composed of sheet iron 75 on the outside and insulating material 76 on the inside as clearly shown by the enlarged section of it in Fig. 4. The motor is protected against accidental contact from above between the wooden beams 69 by the perforated plate 77, secured to the wooden beams so as to be insulated away from the motor. The plate 77 has a perforated lid 78 which is hinged to it at 79 and rests at its sides on the plate, being held in place when closed by a latch 80 on the plate. The high tension conductors to the motor as indicated by 81, may be safely carried in the plate 77 by means of the insulation 82. In order to prevent sparking of the brushes on the commutator to the fullest possible extent, I provide a preventive means additional to the commutating poles 67. The brush holders 83 are made of iron and a magnetic field is provided to envelop the brushes when the motor is running. This is accomplished by the iron magnet frame 84 with the coil 85 which is connected in series with the motor. The pole frame 84 is connected to a frame 86, which is hinged at each side to the wooden beam 69 as at 87, this permitting the device to be quickly raised up out of the way when it is desired to get at the brushes. The arrangement of the magnet 84 with the brushes 83 is clearly shown in dotted lines directly above the left hand axle Fig. 1. The iron framework of the commutator will serve as part of the magnetic circuit and enable a strong magnetic effect to envelop the brushes. The pole faces of the frame 84 are provided with insulating shields 88, to prevent arcing to them.

The four wheel truck shown in Figs. 1 and 2, which I will designate as a whole by the numeral 89, is a complete operating unit. I will now describe the construction of locomotives containing a plurality of such units. Locomotives embodying my invention may be constructed containing two, four, eight or sixteen truck units. Figs. 5, 6 and 7 show one containing eight of the truck units and Figs. 8, 9 and 10 show one containing sixteen truck units.

For the eight truck locomotive, the truck units are connected together in pairs by connecting frames 90, which carry ball headed bolts 91, one at each end. These bolts have taper shanks and are threaded at the end for the nuts 92, which when tightened up cause the bolts to be held firmly in place. Split bushings 93, having their inside surface formed to fit the spherical heads of the bolts are provided. They are made cylindrical in shape on the outside and fit into holes in the frames 13, being secured therein by the bolts 94, as shown in Fig. 1. The frames 90, have central cross pieces 95. The frames 90, are connected together to form four truck units by the frames 96, having ball headed bolts 97, nuts 98, split bushings 99 and bolts 100, one set at each end to connect the frames 96 to the cross pieces 95 of frames 90, the parts 97, 98, 99 and 100, being the same as parts 91, 92, 93 and 94, described more in detail in connection with the frames 90. The frames 96 have the central cross pieces 101. The two frames 96 are connected together by the locomotive car body 102 which has two cross beams 103, one at each end equidistant from a vertical centerline through the center of the car body. These cross beams are provided with ball headed bolts 104, nuts 105, split bushings 106 and bolts 107 to secure them to the central cross pieces 101 of the frames 96 in the same manner as frames 90 are secured to the truck frames 13, and frames 96 to frames 90. As this universal joint connection is shown on a smaller scale in connection with Figs. 8, 9 and 10, I will refer to it as a whole by the numeral 108 there.

In the sixteen truck locomotive shown in Figs. 8, 9 and 10, two eight truck unit sets like that shown in Figs. 5, 6 and 7 are coupled together, two of the frames 96 of each set being connected together by the frame 109 which has two universal joint connections 108, to the cross pieces 101 of the frames 96, and the two frames 109 being coupled together by the locomotive car body 111, by means of the central cross pieces 110 of the frames 109 which are connected to the cross beams 112 of the locomotive car body by the universal joint connections 108.

In Figs. 5, 6 and 7 is shown a swinging draw bar 113, pivotally attached to the cross beam 103, and in Figs. 8, 9 and 10 is shown a similar swinging draw bar 114 attached to cross beam 112.

In Fig. 11 is shown in a diagrammatical way the arrangement of eight wheel truck units 115 which may be used with my invention in place of the four wheel truck units, the frames 116 and 117 corresponding respectively to frames 90 and 96, shown in Figs. 5, 6 and 7, the universal joint connections 108 being used.

Fig. 12 shows in a diagrammatic way a type of electric motor that may be used under certain conditions in place of the motors shown in Figs. 1 and 2, its object being to provide a motor that by its inherent construction will operate with equal speed and power on two different tension currents, one of one half the voltage of the other. 21 represents the axle and 22, 22 the driving wheels corresponding to the axle and driving wheels shown in Figs. 1 and 2; 118 represents the field frame which is similar to the field frame shown in Figs. 1 and 2 except the pole pieces and coils, only two of which are shown as being sufficient for the purpose of illustration, are placed centrally of the width of the frame. The armature 119 has two commutators, one of which 120, with two of its bars connected to the ends of the coil 121 and having positive brush 122 and negative brush 123, and the other commutator 124 with two of its bars connected to the ends of the coil 125 and having a positive brush 126 and negative brush 127. The two coils shown are carried in the same slots. It will be understood that the armature is intended to have sufficient number of coils for best efficiency with a corresponding number of commutator bars, but only enough are shown for purpose of description. The wires from the commutator brushes and the field coils are shown connected to the switch 128 for low voltage supply as from a third rail, and connected to switch 129 for high voltage supply as from a trolley wire, and connected to switches 130, 131, 132, 133 and 134 to enable the placing of the two armature circuits and the field coils all in series or in parallel as desired.

In connection with the locomotive shown in Figs. 5, 6 and 7, located in the car body thereof, is shown mechanism whereby the locomotive can be operated by direct current supply or by high tension single phase alternating current supply without making any change in the construction of the axle driving motors such as shown in Figs. 1 and 2, or in Fig. 12, both of which types being understood to be of the highest possible efficiency as direct current motors. The axle driving motors used are understood to be connected up to suitable controlling mechanism located in the car body, as well known by those skilled in the art, it being usual to have as many series and parallel combinations as possible to regulate the speed of the locomotive. In Fig. 5 reference numeral 135 indicates a current supply conductor to which is connected the switches 136 and 137. The switch 136 is connected to the controlling mechanism of the axle driving motors and is thrown in when direct current from the supply conductor 135 is used, the switch 137 being thrown out. When alternating current is to be supplied to the conductor 135, the switch 136 is thrown out and the switch 137 put in.

In order to employ the high tension alternating current as stated, I provide a rotary converter consisting of four alternating current motors 138, and four direct current generators 139, all placed in line centrally of the length and width of the car body with their armature shafts connected together by the insulating driving couplings 140, to revolve as a unit. The alternating current motors are connected up in series and connected to the switch 137 which is thrown in when alternating current is used, the switch 136 being thrown out. The motors are bodily heavily insulated from each other and from the other parts of the locomotive. All of the alternating current apparatus is inclosed in an insulating compartment composed of the walls 141 of insulating material which may include some plate glass sections to permit inspection of the apparatus from outside the partition. By means of this partition the operatives of the locomotive may pass in safety from one end of the locomotive to the other. The direct current generators are intended to be connected to the controlling mechanism of the axle motors to supply current to drive the axle motors, and to storage batteries 142 to charge them and reversely to be driven by current from the storage batteries to act as motors to start the alternating current motors and bring them up to synchronism with the alternating current supply, suitable controlling apparatus well known to the art being used for that purpose.

It should be noted that instead of connecting the generators 139 directly to the controlling mechanism for the driving motors, additional controlling mechanism, well known in the art, may be interposed to obtain various series-parallel connections of the generators to provide additional running speeds for the locomotive.

It should be further noted with respect to the rotary converter set, that the plurality of alternating current motors is provided so as to enable the dividing up of the voltage so that the tension will not be too high on any one motor, and so that the plurality of both alternating current motors and direct current generators is provided to keep the height and width of the set very small so the center of gravity will be low and to provide space on each side to permit passage of the operatives and access through the floor to the axle motors.

By the mechanical devices described, it will be seen that I have provided a locomotive of very low center of gravity, in which high efficiency gearless motors are mounted directly on the axles in a substantial manner without injurious unsprung weight, with flexible frame construction having center line universal joint connections that equalizes the weight on a plurality of trucks and prevents lifting tendency on the trucks from the draw bar pull; and by the electrical mechanism described, I have provided a locomotive that will operate on a wide variety of current supply. This locomotive will operate with safety at high speeds on tracks with light rails, sharp curves and heavy grades, and with safety at very high speeds on tracks having heavy rails laid on long curves with moderate grades, and can be changed without stopping to use, with safety, current supply from 600 volts to 6000 volts direct current and 12000 volts alternating current.

Having described my invention, I claim:

1. In an electric locomotive, two trucks each comprising a frame, driving wheels and axles, and a frame for connecting the two trucks together for operation on a track, the connections between the connecting frame and the truck frames consisting of two universal joints, one on each truck frame, located with its axis normally on a straight line running through the centers of the axles and at the center laterally of the truck.

2. In an electric locomotive, two trucks each including a frame and two axles, a connecting frame for connecting the two trucks together for operation on a track, the connection of each truck to the connecting frame including a universal joint located with its center of axis centrally between the axles of a truck and normally on a straight line running through the centers of the axles and centrally laterally of the truck.

3. In an electric locomotive, two trucks each including a frame and axles with wheels, and a frame for connecting the two trucks together to operate on a track, the connections of each truck to the connecting frame including a universal joint consisting of a ball headed bolt attached to the end of the connecting frame and a spherical bearing for the ball head of the bolt located on the truck so as to have the axis of the universal joint centrally laterally of the truck and normally on a straight line through the centers of the axles.

4. In an electric locomotive, two trucks each comprising two trucks having wheels and axles and connected together by two frames with universal joint connections, and a frame for connecting the said two frames together by means of two universal joints, one on each of the said two frames with its axis centrally of the frame and normally on a straight line running through the centers of the axles.

5. In an electric locomotive, two trucks, each comprising four trucks coupled together in pairs by two frames and the two frames connected together by an additional frame, and a frame for connecting the two said additional frames together to operate the eight trucks as a unit, the connection of the last mentioned frame to the said two additional frames consisting of universal joints, one on each of the said additional frames, with its axis central laterally of the additional frame and normally on a straight line running through the centers of the axles of the trucks.

6. In an electric locomotive, two trucks, each consisting of eight pairs of wheels, each pair of wheels having a common axle, all the wheels being of uniform size, the axles being coupled together in pairs to provide units having four wheels each, frames connecting adjacent units together and a frame for coupling the said first two frames together by universal joints one on each of said first mentioned frames, located centrally laterally of the frame and normally on a straight line running through the centers of the axles.

7. In an electric locomotive, two trucks each comprising a frame with axles on which are mounted wheels of uniform size, and a frame for connecting the two trucks together for operation on a track, the connections being made by a universal joint connection, one to each truck, having their axes located centrally laterally of the trucks and normally on a straight line running through the centers of the axles and with the connecting frame located between the planes determined by the tops and bottoms of the wheels respectively.

8. In an electric locomotive, a plurality of trucks having axles with wheels of uniform size, and a plurality of frames for connecting the trucks by universal joint connections located with their axis on a straight line running through the centers of the axles, and with said frames located between the planes determined by the tops and bottoms of the wheels respectively.

9. In an electric locomotive, an axle, wheels mounted on the axle, axle boxes mounted on the axle each having at its lower side a depending pocket or saddle with a helical spring therein, a leaf spring supported by said helical spring, and a frame guided by the axle boxes and resting on said leaf spring for resilient vertical movement.

10. In an electric locomotive, two axles spaced apart, axle boxes on the axles each having an inverted leaf spring resiliently attached below it having freedom of vertical movement, equalizing bars adapted to rest at their ends on the upper side of the contiguous ends of the leaf springs, and a frame guided by the axle boxes and resting on the outer ends of the leaf springs and on the centers of the equalizing bars for resilient vertical movement.

11. In an electric locomotive, an axle, driving wheels mounted on the axle, an axle box mounted on the axle, a frame with portions extending above and below the axle box and having a vertical slot to receive the axle box, a dependent pocket attached to the lower side of the axle box and extending normally below the bottom surface of the frame, and a detachable brace on the frame across the slot below the axle box and at the side of the dependent pocket with its lower surface normally above the bottom of the dependent pocket.

12. In an electric locomotive, an axle, driving wheels mounted on the axle, an axle box mounted on the axle, a frame with portions extending above and below the axle box and having a vertical slot to receive the axle box, a dependent pocket attached to the lower side of the axle box, and two detachable braces on the frame across the slot below the axle box, and covering the sides of said pocket.

13. In an electric locomotive, two trucks having axles with wheels of approximately uniform size, two frames, one for each truck, for holding the component parts of the truck together, a car body mounted above the trucks and having two rigid members extending downwardly and each having a universal joint connection with one of the said frames with its axis central laterally of the frame and on a straight line running through the centers of the axles, and a drawbar vertically pivotally mounted on each of said members.

14. In an electric locomotive, an axle, wheels mounted on said axle, axle boxes mounted on said axle each having at its lower side a depending pocket or saddle with a helical spring therein, a leaf spring resiliently supported by said helical spring and having freedom of vertical movement, and a frame guided by said axle boxes and supported by the ends of said leaf spring for resilient vertical movement therewith, said leaf springs being connected together to distribute weight equally upon the driving wheels.

15. In an electric locomotive, an axle, wheels mounted on said axle, axle boxes mounted on said axle each having at its lower side a depending pocket or saddle, leaf springs mounted in said pocket for vertical movement relative to said axle, and a frame guided by said axle and resting on said leaf springs for resilient vertical movement.

16. In an electric locomotive, two trucks each comprising a frame, driving wheels and axles, and a frame for connecting the two trucks together for operation on a track, the connections between the connecting frame and the truck frame comprising two pivotal joints, one on each truck frame, located with its axis normally on a straight line running through the center of the axles and at the center laterally of the trucks.

17. In an electric locomotive, a plurality of trucks with wheels thereon, a plurality of frames for connecting the trucks by pivotal joint connections located with their axes on a straight line running through the centers of the axles, and with said frames located between the planes determined by the tops and bottoms of the wheels respectively.

EDMUND C. MORGAN.